No. 670,052. Patented Mar. 19, 1901.
A. KOBELT.
BROOM CORN HARVESTER.
(Application filed Nov. 13, 1900.)
(No Model.) 2 Sheets—Sheet 1.
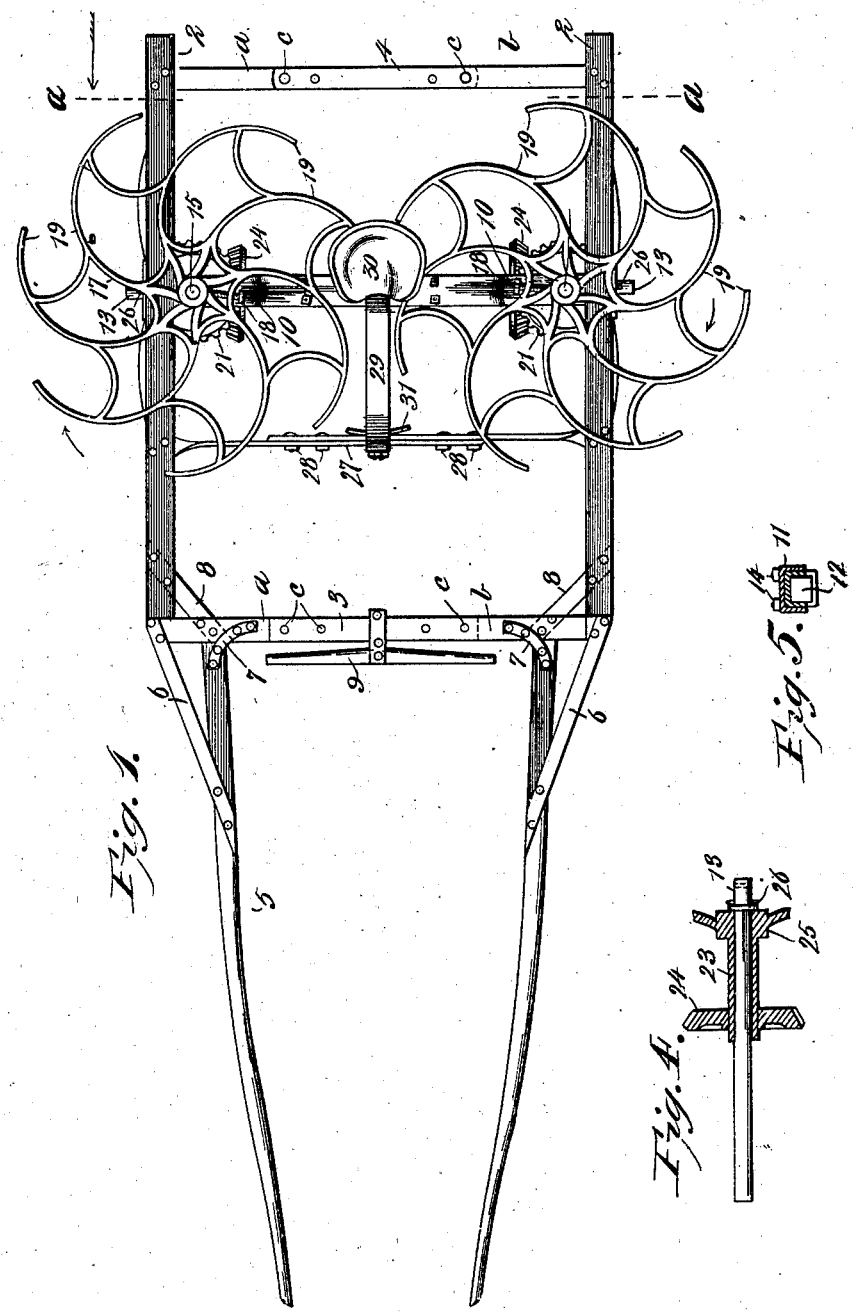

No. 670,052. Patented Mar. 19, 1901.
A. KOBELT.
BROOM CORN HARVESTER.
(Application filed Nov. 13, 1900.)
(No Model.) 2 Sheets—Sheet 2.
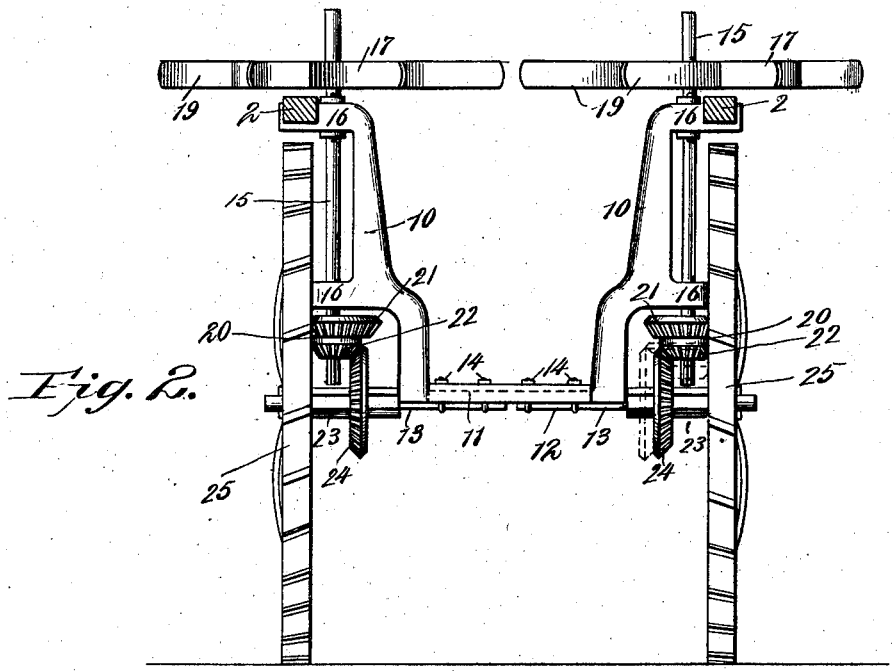
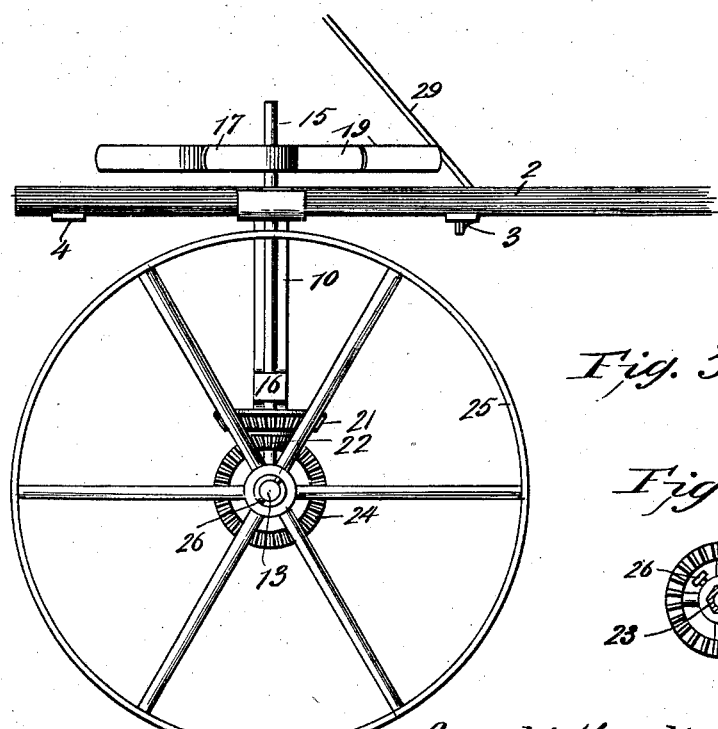
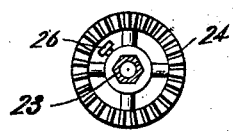
Witnesses Arnold Kobelt, Inventor.
by
Attorneys

United States Patent Office.

ARNOLD KOBELT, OF LOWRY CITY, MISSOURI.

BROOM-CORN HARVESTER.

SPECIFICATION forming part of Letters Patent No. 670,052, dated March 19, 1901.

Application filed November 13, 1900. Serial No. 36,400. (No model.)

*To all whom it may concern:*

Be it known that I, ARNOLD KOBELT, a citizen of the United States, residing at Lowry City, in the county of St. Clair and State of Missouri, have invented a new and useful Broom-Corn Harvester, of which the following is a specification.

My invention is an improved broom-corn harvester; and it consists in the peculiar construction and combination of devices hereinafter fully set forth, and pointed out in the claims.

In the accompanying drawings, Figure 1 is a top plan view of a broom-corn harvester embodying my improvements. Fig. 2 is a transverse sectional view of the same, taken on a plane indicated by the line *a a* of Fig. 1. Fig. 3 is a side elevation of the same. Figs. 4, 5, and 6 are detail views.

The frame of the harvester is of rectangular form and comprises the side bars 2 and the front and rear connecting-bars 3 4. Each of said connecting-bars is composed of two sections *a b*, which overlap each other and are bolted together, as at *c*. Thereby the frame may be widened or narrowed, as may be required. The shafts 5 are secured to the front cross-bar 3 and are suitably braced, as at 6, 7, and 8. In the form of my invention here shown the singletree 9 is attached directly to the front cross-bar 3.

A pair of standards 10 have their upper ends secured to the side bars 2 of the frame. Said standards are disposed within and depend from the said side bars and are provided at their lower ends with inwardly-extending arms 11, which overlap each other. The axle 12 of the machine is formed of two sections 13, the inner ends of which are bolted to the arms 11 of standards 10 by the bolts 14, which also bolt said overlapping arms together. Thereby the standards 10, together with the sections of the axle, may be adjusted toward or from each other to correspond with the lateral adjustment of the sides of the frame. Hence the machine, which is adapted to operate and run between two rows of broom-corn, may be widened or narrowed to accommodate itself to the width of the space between the rows of broom-corn.

Vertical shafts 15 are journaled in bearings 16, with which the standards 10 are provided. Revoluble break-wheels 17 are secured to and vertically adjustable on the upper portions of shafts 15, said break-wheels having set-screws 18, by means of which they may be thus adjusted and secured to said shafts. The said break-wheels are provided with volute break-arms 19, and said break-wheels when the machine is in operation rotate in the directions indicated by the arrows in Fig. 1, the volute break-arms thereof, which sweep over the side bars 2, engaging the heads of the standing stalks of broom-corn as the machine passes between the rows thereof, and said break-arms and said side bars 2 coacting to break the heads of the broom-corn, which heads of the broom-corn after being thus broken are cleared by the volute break-arms and left pendent from the stalks, clear of the ground, to cure and are subsequently gathered in the usual manner.

It will be observed by reference to the drawings that neither the break-arms nor the coacting side or break bars have sharpened cutting edges, but that the same are blunt, and it will be further observed that the break-arms rotate in a plane at some distance from that occupied by the coacting break-bars, thus adapting the machine to break the heads of the broom-corn, as hereinbefore described, dispose them at right angles to the stalks and pendent therefrom, and avoid cutting the heads clear from the stalks, as would result if the coacting break arms and bars were sharpened or disposed in closely-contiguous planes.

On the lower portions of the shafts 15 are splined beveled gears 20, which are hence vertically adjustable on the lower portions of said shafts 15, and each of said beveled gears 20 comprises an upper section 21 of greater diameter and a lower section 22 of less diameter.

On the spindles of the outer ends of the sections of the axle are mounted sleeves 23, which are of angular form in cross-section. Traction-wheels 25 are secured to the outer ends of said sleeves and revolve therewith, or said traction-wheels and sleeves may be formed integrally, as may be preferred. Said traction-wheels support the machine, as will be understood. When the machine is in operation, gears 24, which turn with and are adjustable on the sleeves, by engaging the gears 20 communicate power to the shafts 15, and hence rotate the break-wheels. By means of a suitable linchpin 26 or other suitable devices the sleeves 23, with gears 24, may be adjusted in or out upon the said sleeves and engaged with either the sections 21 of gears 20 or the sections 22 of said gears. When said gears 24 are engaged with the sections 22, it will be understood that the speed of the break-wheels will be increased.

The side bars 2 of frame 1 are connected together at a suitable distance from their front ends by a bar 27, which is made in two sections, which overlap each other and are secured together by bolts 28. The said bar 27 supports the seat-bar 29, which carries the seat 30 and a foot-rest 31.

Having thus described my invention, I claim—

1. In a broom-corn harvester, a breaking device consisting of a stationary blunt break-bar and a revoluble break element having blunt break-arms, and disposed above and spaced from said break-bar and acting therewith, said break-bar and revoluble break element being disposed at a suitable height to break the stalks near the heads of the broom-corn, substantially as described.

2. In a broom-corn harvester, the frame comprising the side bars, the extensible cross-bars connecting said side bars, the standards depending from said side bars and having the overlapping arms, in combination with the axle-sections secured to the said standards, the traction-wheels on said axle-sections, the vertical shafts in bearings in said standards, gears connecting said shafts and said traction-wheels, and the break-wheels on said shafts, said break-wheels and side bars of the frame coacting, substantially as described.

In testimony that I claim the foregoing as my own I have hereto affixed my signature in the presence of two witnesses.

ARNOLD KOBELT.

Witnesses:
FRITZ LEE HILTY,
JOHN CALVIN KNIESIM.